United States Patent Office 2,811,532
Patented Oct. 29, 1957

2,811,532
N,N-DISUBSTITUTED CARBONATO AMIDES

William L. Riedeman, Philadelphia, Pa., assignor to Rohm & Haas Company, Philadelphia, Pa., a corporation of Delaware No Drawing. Application April 6, 1954,
Serial No. 421,439

7 Claims. (Cl. 260—340.2)

This invention relates to N,N-disubstituted carbonato amides of fatty acids which contain 16 to 22 carbon atoms. It relates to those carbonato amides which contain in the acid moiety thereof 16 to 22 carbon atoms and also one or more groups having the formula

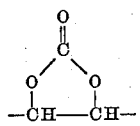

and which contain on the amido nitrogen atom two monovalent hydrocarbon groups—preferably alkyl groups—containing a total of 2 to 14 carbon atoms. More particularly it relates to N,N-disubstituted amides of carbonatostearic acid having the general formula

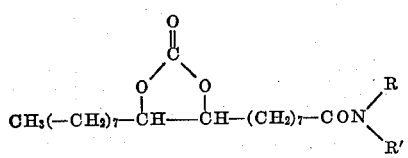

in which R and R' represent the same or different monovalent hydrocarbon groups, the total of whose carbon atoms is 2 to 14. Preferably R and R' represent alkyl groups. It also relates to the preparation and use of the carbonato amides.

The compounds of this invention are unusually high boiling liquids which are highly compatible with a wide variety of plastic materials. By virtue of the presence of the carbonato groups in the fatty acid chains, they are far more compatible with plastic materials, such as cellulosic esters and vinyl halide resins than are the corresponding amides which do not contain carbonato groups. Accordingly, they are recommended for use as plasticizers in plastic compositions.

In the preferred process for making the products of this invention, phosgene is reacted with an amide containing at least two hydroxyl groups on adjacent carbon atoms. Hydrogen chloride is split out and, therefore, the reaction is best carried out in the presence of an acceptor for hydrogen chloride. The starting material is an amide which contains one or more pairs of hydroxyl groups on adjacent carbon atoms of the aliphatic chain. Such polyhydroxy amides are made by known methods. For example, an amide of an unsaturated acid which contains one or more double bonds is reacted with hydrogen peroxide and a large excess of formic acid or acetic acid whereby an hydroxy-acyloxy derivative is produced. This, in turn, is converted to the polyhydroxy compound by hydrolysis of the acyloxy group or by alcoholysis.

It is now evident that the starting material is an amide of an acid which contains 16 to 22 carbon atoms and also contains one or more double bonds. Typical are the disubstituted amides of oleic, erucic, elaeostearic, linoleic, linolenic, clupanodonic, and palmitolenic acids. All of these acids occur in animal and vegetable oils, for example, in soybean, rapeseed, linseed, sardine and whale oils, and are readily obtained by the hydrolysis of the naturally occurring oils. This invention also embraces mixtures of amides such as those made from a mixture of fatty acids. Since all of these amides contain aliphatic unsaturation, they can readily be converted first to the polyhydroxy derivative and thereafter to the carbonato products. It is preferred that all of the double bonds in any given amide be converted to carbonato groups. It has been found, however, that the carbonato group imparts to an amide such greatly enhanced solubility in, and compatibility with, plastic materials, particularly of the vinyl resin type, that it is not essential that every double bond be converted to a carbonato group. It is essential, however, that at least one double bond in each amide be thus converted.

The substituents, R and R', on the amido nitrogen atom are hydrocarbon groups, preferably alkyl groups. The groups can be the same or different but the total number of carbon atoms in the two groups should not exceed 14 if the final carbonato compounds are intended to be used as plasticizers for vinyl halide resins. Furthermore, the groups can be alkyl, aryl, cycloalkyl or aralkyl typified by the following: methyl, ethyl, n-propyl, n-butyl, sec-butyl, tert-butyl, tert-amyl, n-octyl, 2-ethylhexyl, lauryl, myristyl, benzyl, phenyl, phenylethyl, and the isomers and homologues of these groups. The amides are obtained by reaction of a secondary amine with the unsaturated acid or the acid containing the hydroxyl groups and the substituents on the amido nitrogen atom are of course those originally present in the amine thus reacted. Such secondary amines are well-known and a wide variety of them is available commercially.

The carbonato amides which have already proven to be especially valuable as plasticizers for polyvinyl resins and which, therefore, have the greatest commercial promise at the moment are those of 9,10-carbonatostearic acid having the formula

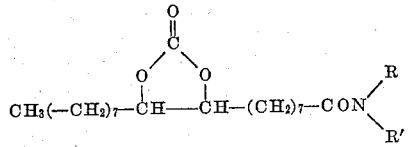

in which R and R' have the significance described above.

The reaction of phosgene with the polyhydroxy disubstituted amide is best carried out at a temperature from —10° C. to the boiling point of the reaction mixture. In commercial practice, it is preferred to carry out the reaction at a temperature from about —10° C. to about 60° C. because of the volatility of the phosgene. The phosgene may be reacted in the gaseous form with the amide; but a more satisfactory method appears to be that of reacting the amide with a solution of phosgene in an organic liquid, such as benzene, which is a solvent for the amide. It is most desirable that a mildly basic acceptor for hydrogen chloride be present; and for this purpose tertiary amines and weakly basic anion-exchange resins have each been used. Pyridine is very effective and its use is recommended at lower temperatures while anion-exchange resins are best used at higher temperatures. Other tertiary amines which can be used like pyridine include quinoline, isoquinoline, dimethylaniline, diethylaniline, trimethylamine, triethylamine, tri-n-butylamine, and the like. What is desired is that an acceptor be present which will take up the hydrogen chloride as fast as it is formed.

The property which makes the products of this invention so efficient as plasticizers, particularly for vinyl halide resins, is their stability in plastic compositions. They are readily dispersed in plastic compositions and thereafter remain permanently in the compositions. They are not easily extracted by means of solvents or aqueous solutions and they do not tend to migrate to the surfaces of such compositions. At the same time, they impart a high degree of flexibility which is retained even at low temperatures. The vinyl resins which can be plasticized to advantage with the carbonato amides of this invention are more properly defined as "vinyl halide resins" and this term is herein used to embrace the following: polymers of vinyl halide, such as vinyl chloride and vinyl bromide; copolymers of a vinyl halide and a vinyl ester of the lower aliphatic acid, such as copolymers of vinyl chloride and vinyl acetate or vinyl propionate; copolymers of vinyl halides, such as vinyl chloride and vinylidene halides, such as vinylidene chloride; and copolymers of a vinyl halide with other copolymerizable compounds containing a vinylidene group,

such as ethyl acrylate, methyl methacrylate and the like. Preferred resins of this type are those which contain from about 60 to about 95% of copolymerized vinyl chloride and 5% to 40% of another copolymerized vinylidene compound.

The following example illustrates the manner in which the compounds of this invention may be made. The example is drawn to the preparaiton and use of N,N-dimethyl-9,10-carbonato-stearamide; but it is to be understood that the other amides embraced by this invention are preferred in the same manner and are employed in the same way in plastic compositions.

Example 1

Into a reactor equipped with thermometer, agitator and condenser were charged 171.5 grams (0.5 mol) of N,N-dimethyl-9,10-dihydroxystearamide, 275 milliliters of toluene, and 110 grams of pyridine (1.4 mol). The stirred mixture was cooled to −5° C. and to it was added over a period of one hour a cold (0° C.) solution of 64.4 grams (0.65 mol) of phosgene in 250 milliliters of toluene. The mixture was stirred at −5° C. for one-half hour and was then allowed to warm up to room temperature where it was maintained for 17 hours. The reaction mixture was thoroughly washed with water, stripped of solvent and fractionally distilled. The product, N,N-dimethyl-9,10-carbonatostearamide, was a pale oil which boiled at 262° C./1.1 mm. to 253° C./0.2 mm. and which had an index of refraction ($n_D^{25}$) of 1.4719. Its composition was confirmed by analysis (percent C: theory=88.25, analysis= 88.45; percent H: theory=10.64, analysis=10.40; percent N: theory=3.79, analysis=3.63).

The product was compatible with the above noted vinyl halide resins and served as a plasticizer for them. Dried films of the blends were uniformly transparent. Such compositions are claimed in U. S. Patent No. 2,755,265, which issued on continuation-in-part application Serial No. 472,502 filed December 1, 1954.

I claim:

1. A carbonato, N,N-disubstituted amide which contains in the acid moiety thereof 16 to 22 carbon atoms and which also contains on the acid moiety one to three groups having the structure

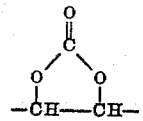

and which contains on the amido nitrogen atom two monovalent hydrocarbon radicals free of non-aromatic unsaturation which together contain a total of 2 to 14 carbon atoms.

2. A carbonato, N,N-disubstituted stearamide having the general formula

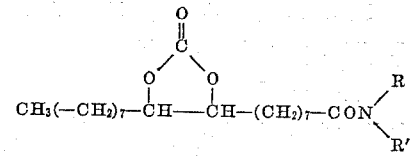

in which R and R' represent monovalent hydrocarbon radicals free of non-aromatic unsaturation which together contain a total of 2 to 14 carbon atoms.

3. A carbonato, N,N-disubstituted stearamide having the general formula

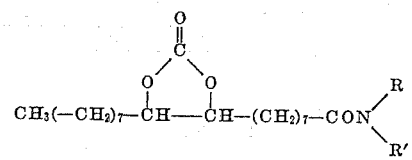

in which R and R' represent alkyl groups which together contain a total of 2 to 14 carbon atoms.

4. N,N-dimethyl-9,10-carbonatostearamide.

5. A process for preparing carbonato N,N-disubstituted amides which comprises reacting, at a temperature from about −10° C. to about the boiling point of the reaction mixture in the presence of an hydrogen chloride acceptor, phosgene and an N,N-disubstituted amide, whose acid moiety contains 16 to 22 carbon atoms and at least one pair of hydroxyl groups on adjacent carbon atoms, and which amide contains on the amido nitrogen atom thereof two monovalent hydrocarbon radicals free of non-aromatic unsaturation which together contain a total of 2 to 14 carbon atoms.

6. A process for preparing an N,N-disubstituted-9,10-carbonatostearamide which comprises reacting, at a temperature from about −10° C. to about the boiling point of the reaction mixture in the presence of an hydrogen chloride acceptor, phosgene and an N,N-disubstituted-9,10-dihydroxystearamide, said amide containing on the amido nitrogen atom thereof two alkyl substituents which together contain a total of 2 to 14 carbon atoms.

7. A process for preparing N,N-dimethyl-9,10-carbonatostearamide which comprises reacting, at a temperature from about −10° C. to about the boiling point of the reaction mixture in the presence of an hydrogen chloride acceptor, phosgene and N,N-dimethyl-9,10-dihydroxystearamide.

References Cited in the file of this patent

UNITED STATES PATENTS

| Number | Name | Date |
|---|---|---|
| 921,944 | Berendes | May 18, 1909 |
| 2,316,371 | Strother | Apr. 13, 1943 |
| 2,379,261 | Strain | June 26, 1945 |
| 2,527,240 | Baird | Oct. 24, 1950 |
| 2,601,255 | Bruson | June 24, 1952 |
| 2,667,497 | Cline | Jan. 26, 1954 |